United States Patent [19]

Patouillard et al.

[11] Patent Number: 5,257,844
[45] Date of Patent: Nov. 2, 1993

[54] DUAL STANDARD LIFTING CRADLE

[75] Inventors: Jean B. Patouillard, Villars; Albert Heritier, Veauche, both of France

[73] Assignee: Marrel

[21] Appl. No.: 869,002

[22] Filed: Apr. 15, 1992

[30] Foreign Application Priority Data

Apr. 19, 1991 [FR] France .................. 9104868

[51] Int. Cl.⁵ .................. B60P 1/64; B66C 1/22
[52] U.S. Cl. .................. 294/67.1; 294/68.3; 414/498
[58] Field of Search .............. 294/15, 67.1–67.31, 294/67.4, 68.1–68.21, 68.3, 81.1, 81.2, 81.3, 81.5, 81.53, 81.55; 108/51.1, 54.1, 55.1, 56.1; 414/467, 475, 477, 494, 498, 500, 546, 549, 559, 607, 608

[56] References Cited

U.S. PATENT DOCUMENTS

| | | | |
|---|---|---|---|
| 3,107,802 | 10/1963 | Blonsky | 414/498 |
| 3,244,446 | 4/1966 | Bopp | 294/67.21 |
| 3,275,367 | 9/1966 | Bopp | 294/67.21 |
| 3,404,792 | 10/1968 | Frieberg | 294/67.21 X |
| 3,984,013 | 10/1976 | Wirz | 414/498 X |
| 4,341,500 | 7/1982 | Laitinen | 414/498 |
| 4,848,619 | 7/1989 | Corompt | 414/498 X |
| 4,911,318 | 3/1990 | Bishop | 414/498 X |
| 5,163,800 | 11/1992 | Raisio | 414/498 X |

FOREIGN PATENT DOCUMENTS

| | | |
|---|---|---|
| 0404620 | 12/1990 | European Pat. Off. . |
| 2185520 | 1/1974 | France . |
| 2294877 | 7/1976 | France . |
| 2194769 | 3/1988 | United Kingdom ............ 294/67.22 |

Primary Examiner—Johnny D. Cherry
Attorney, Agent, or Firm—Remy J. VanOphem

[57] ABSTRACT

A movable lifting cradle having two longitudinal beams at one end of each of which a vertical extension is fixed which carries at its top a holding bar. The bar is carried by a bar-carrying assembly having a fixed base on which is mounted, to pivot with a predetermined angular displacement about a transverse axis, a pivotable assembly of which the bar forms a part, the base being provided with members adapted to block the pivoting of the pivotable assembly in a first configuration in which the bar is at a first distance in front of a crossbeam of the lifting cradle and at a first height relative to the longitudinal beams, and in a second configuration in which the bar is at a second distance in front and at a second height, the first distance and height conforming to a first standard and the second distance and height conforming to a second standard.

10 Claims, 4 Drawing Sheets

DUAL STANDARD LIFTING CRADLE

FIELD OF THE INVENTION

The invention relates generally to a lifting cradle, particularly the interfacing elements which make it possible for a load, such as a skip, a container, a platform or the like to be manipulated by means of a loading/unloading arm (for example of the type described in French Patent FR-2185520), in order to unload it onto the ground, onto a truck or onto any other receiving surface.

BACKGROUND OF THE INVENTION

A lifting cradle of this kind consists primarily of two horizontal beams which each have a vertical extension fixed at one end which is terminated by a holding ring or bar adapted to cooperate with the lifting hook of a loading/unloading arm. The loading body proper is fixed to the vertical extension and to the longitudinal beams which form the cradle (sometimes it is called a skeleton cradle), in practice by bolting or welding.

The correct maneuvering of such a cradle relies on a perfect equivalence between the lifting cradle and the arm with which it is manipulated. This is why standards have been set as to the height of the holding ring or bar relative to the longitudinal beams and the distance by which the ring sits forward relative to the ends of the longitudinal beams. In practice, the forward distance is measured relative to a crossbeam designed, when used for loading the lifting cradle onto a lorry, to come to bear behind the vertical column supporting the bar.

However, these standards, in particular DIN and AFNOR standards, have the disadvantage of requiring different values for the aforementioned distances, so that a lifting cradle conforming to one standard can only be correctly loaded and unloaded by an arm which itself conforms to the same standard. This is disadvantageous because for each loading/unloading operation it is necessary to check the identity of the standards and, if they differ, to arrange to replace either the arm (that is to say in most cases the lorry equipped with the arm) or the lifting cradle.

It has already been proposed, in order to be free of the requirements arising from the difference between the standards, to make the height of the arms adjustable and/or to increase the internal opening of the gripping hook so as to adapt it for lifting cradles conforming to two standards, but this results in decreased safety during manipulations and very rapid wear of the parts in contact.

SUMMARY OF THE INVENTION

An object of the invention is to overcome these disadvantages by eliminating the risks of incompatibility of the lifting cradle and the arm despite the co-existence of two standards such as DIN and AFNOR, without however adversely affecting either the operational safety or the life of the elements concerned.

In contrast to known solutions to the problems, where attempts have been made to modify the loading/unloading arms, the invention proposes to make adaptations to the lifting cradles.

More specifically, the invention proposes a movable lifting cradle having two elongate members, each of which has an end carrying a vertical extension adapted to support a base part on which is pivotably mounted a holding bar arranged to move about a transverse pivoting axis between first and second positions and means for holding the bar in a selected one of the first and second positions. In the first position, the holding bar is at a first distance in front of a crossbeam extending crosswise between the two elongate members of the lifting cradle and at a first height relative to the elongate members, and in the second position the holding bar is at a second distance in front and at a second height, the first distance and height conforming to a first standard and the second distance and height conforming to a second standard.

The holding bar is preferably mounted to the base by means of an assembly which pivots with a predetermined angular displacement about the transverse pivoting axis.

Preferred embodiments of the present invention Utilize the following features, either singly or in combination:

The distances and heights conform to DIN and AFNOR standards.

The base part has two slots within which two parallel flanges, connected to one another by the holding bar, pivotably slide.

The flanges are shaped as angular sectors which are centered on the pivoting axis and the holding bar is connected to them at upper corners situated at a distance from the axis.

One of the flanges constitutes a radial finger adapted to bear circumferentially against a rectractable stop and against a second, fixed stop.

The retractable stop is the end of a bar parallel to the pivoting axis and its rectilinear displacement about its axis is controlled by a maneuvering bar articulated on the base.

The holding means constitutes a finger parallel to the pivoting axis and having a rectilinear displacement about its axis controlled by a maneuvering bar articulated on the base and adapted to penetrate, or not, into one or the other of two apertures formed in one of the flanges at the same distance from the pivoting axis and offset angularly by an angle equal to the angular displacement.

One of the flanges is a radial finger for positioning the pivotable assembly in one or the other of its configurations and the other flange is two apertures offset angularly about the axis for pivoting by an angle equal to the angular displacement and respectively adapted to receive, in the configurations, a retractable blocking finger.

The radial finger is adapted to bear circumferentially against a fixed stop and a retractable stop, the retractable stop and the retractable blocking finger being attached to a common maneuvering bar articulated on the base part.

The base part is a U-shaped piece, the concave surface of which faces towards the front of the lifting cradle, and which has two wings bordered by the slots, a back wall and two horizontal fixing plates extending laterally opposite one another.

The objects, characteristics and advantages of the invention will be apparent from the following description given by way of example only, with reference to the attached drawings.

DETAILED DESCRIPTION OF THE PREFERRED EMBODIMENT

Figure 1:
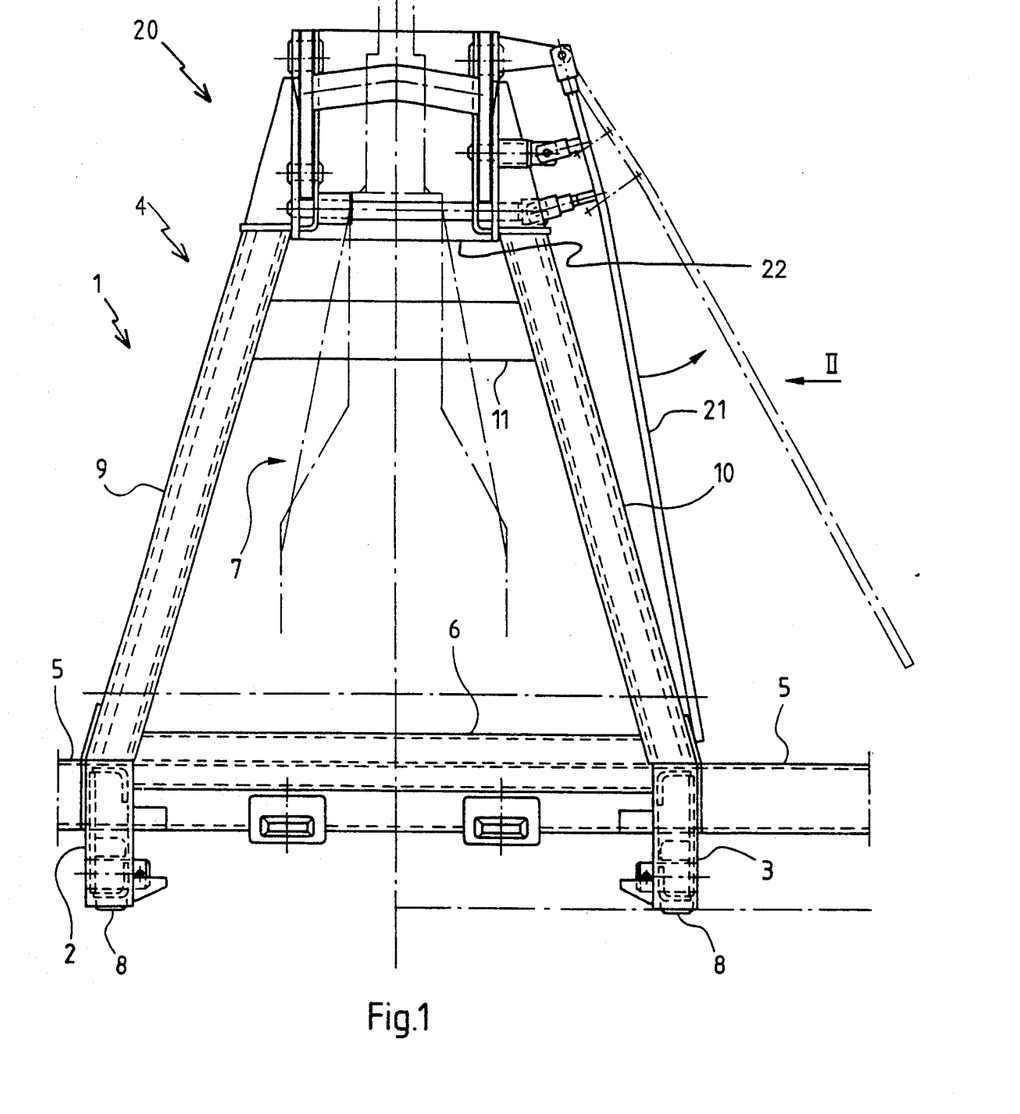
FIG. 1 is a detailed view, from the front, seen in the direction of the arrow I in FIG. 2, of a lifting cradle in accordance with the invention.
Figure 2:
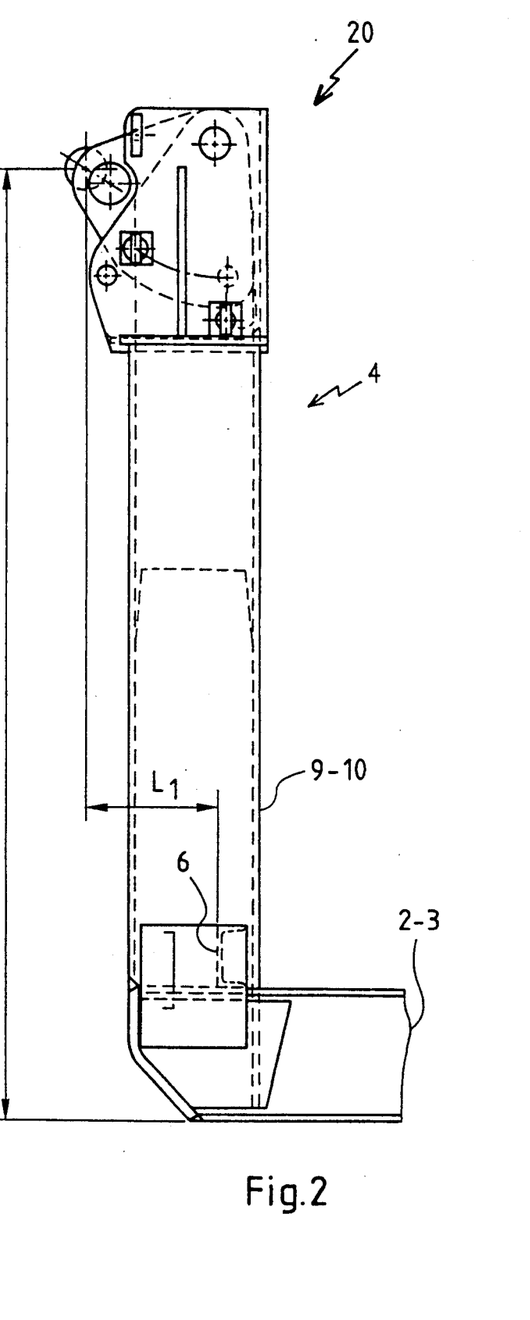
FIG. 2 is a partial side view seen in the direction of the arrow II in FIG. 1.
Figure 3:
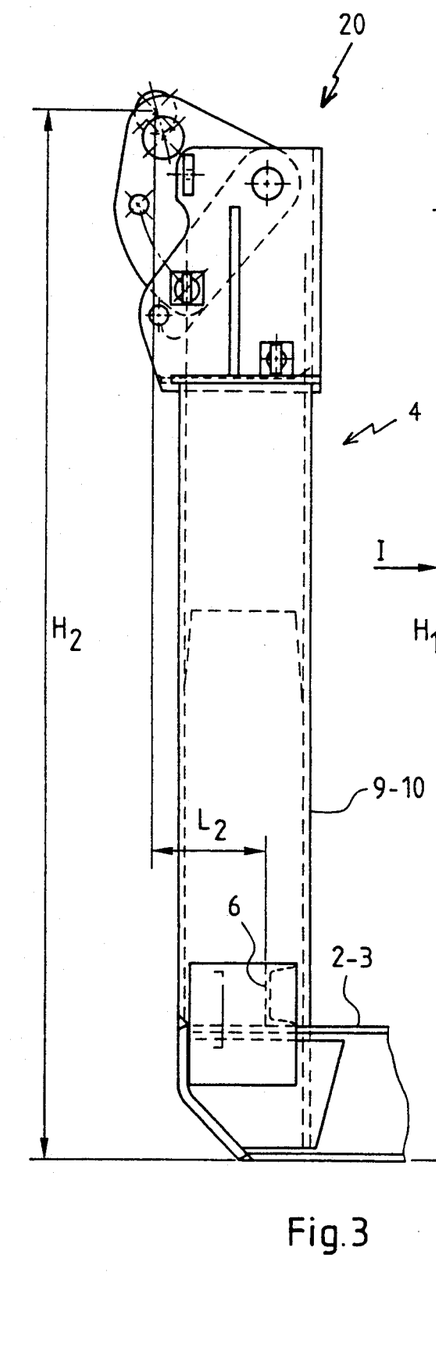
FIG. 3 is another side view after the holding bar has been is raised.
Figure 4:
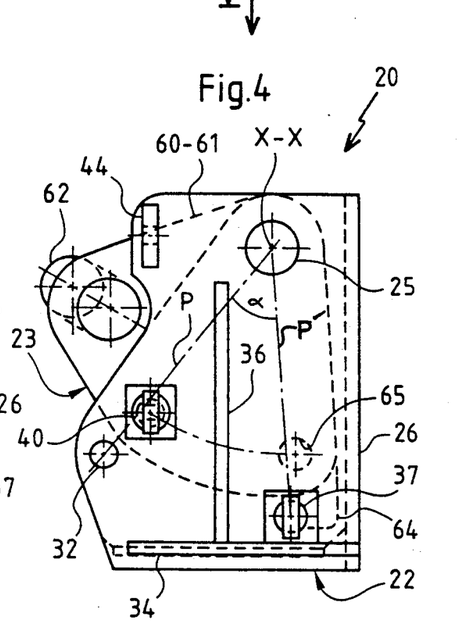
FIG. 4 is an enlarged view, seen from the side, of the bar-carrying assembly in its configuration shown in FIG. 2.
Figure 5:
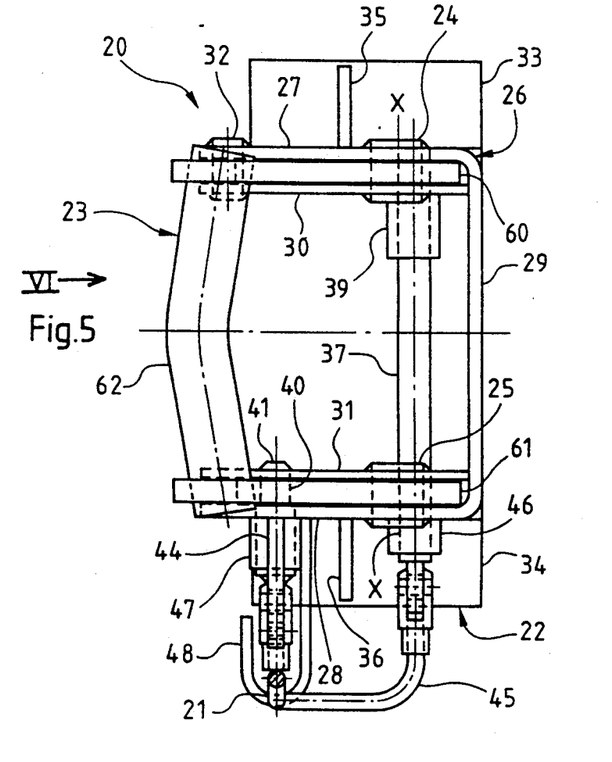
FIG. 5 is a view from above, seen in the direction of the arrow V in FIG. 4.

A lifting cradle 1 shown in FIGS. 1 to 3 includes, in a conventional manner, two longitudinal beams 2 and 3 and at one end, called the front end, of these longitudinal beams, a vertical extension 4 sometimes called a "bell tower". In a conventional manner the lifting cradle also includes crossbeams 5 and 6 extending laterally from these longitudinal beams as far as lateral profiled sections which are not shown.

One of the crossbeams fixed between the front ends of the longitudinal side beams functions as an arresting crossbeam which is adapted to come to bear behind a loading/unloading arm 7, only the upper portion of which is shown in chain dotted lines in FIG. 1.

The lower sides 8 of the longitudinal beams, by means of which the lifting cradle can rest on the chassis of a lorry or any other bearing surface, determine a reference level.

The vertical extension 4 is formed by two inclined columns 9 and 10 starting from the front ends of the longitudinal beams and converging towards a bar-carrying assembly 20 shown in more detail in FIGS. 4 to 7. A crossbeam 11 joins the inclined columns.

In accordance with the described embodiment of the invention, the bar-carrying assembly 20 is articulated and is equipped with a maneuvering bar 21 extending downwardly and in this case located alongside one of the columns 10. The maneuvering bar 21 is not shown in FIGS. 4 and 7 to make them easier to understand.

The bar-carrying assembly 20 substantially is composed of a base 22 fixed in this case by welding to the upper cross-sections of the columns 9 and 10 and a pivotable assembly 23 mounted to pivot on the base 22 about a horizontal transverse axis X—X, formed here by two rivets 24 and 25 forming pivoting points.

In this example, the base has a U-shaped piece 26, the concave part of which faces forward and which has two vertical wings 27 and 28 connected to a vertical back wall 29. Two vertical plates 30 and 31 are fixed inside the U-shaped piece parallel to the vertical wings and define with the wings slots designed to receive the pivotable assembly. The wings and the plates are connected by the rivets 24 and 25. In addition, the wing 27 and the associated plate 30 are connected by a blocking rivet 32 disposed at a distance from axis X—X. The lower edges of the plates 30 and 31 are bent towards the wings 27 and 28 and are connected at their front edges to the latter (see FIG. 6).

Horizontal fixing plates 33 and 34, designed to be fixed to the cross-section of the columns 9 and 10, are held at right angles to the wings by means of triangular reinforcing spacers 35 and 36, fixed near the base of the wings.

The wings 27 and 28 and the vertical plates 30 and 31 constitute, at the same distance from the axis X—X as the blocking rivet 32, coaxial apertures through which a rod 37 passes which is adapted to slide along its axis between a resting configuration, in which a free end 38 (see FIG. 6) penetrates into one of the wings (in this case the wing 27) through which the blocking rivet 32 passes, and a retracted configuration (not shown) in which the end is disengaged from the slot bordering the wing and is retracted into the associated vertical plate 30. To prevent any possible escape of the free end 38 out of the plate, a guide sleeve 39, coaxial with the rod and within which the latter slides, is fixed by welding to the plate 30.

The wing 28 and the facing plate 31 also contain facing apertures, located at a smaller distance from the axis X—X than the blocking rivet 32 or the rod 37, in which a pin 40 is engaged. The pin is adapted to slide along its axis between the resting configuration, in which a free end 41 of the pin passes through the plate 31, and a retracted configuration in which the end is disengaged from the slot between the plate 31 and the wing 28.

At their other ends the rod 37 and the pin 40 are attached, by means of articulated joints 42 and 43 having horizontal axes perpendicular to the X—X axis, to the maneuvering bar 21 which is itself articulated at its upper end 21A to a connecting element 44 projecting laterally from the wing 28 on the upper part of the latter.

In practice, the rod 37 is not in the same vertical plane as the pin 40 and it is connected to the maneuvering bar 21 by an elbowed rod 45.

As is the case with the plate 30, the wing 28 has guide sleeves 46 and 47 for the rod 37 and the pin 40.

Figure 6:
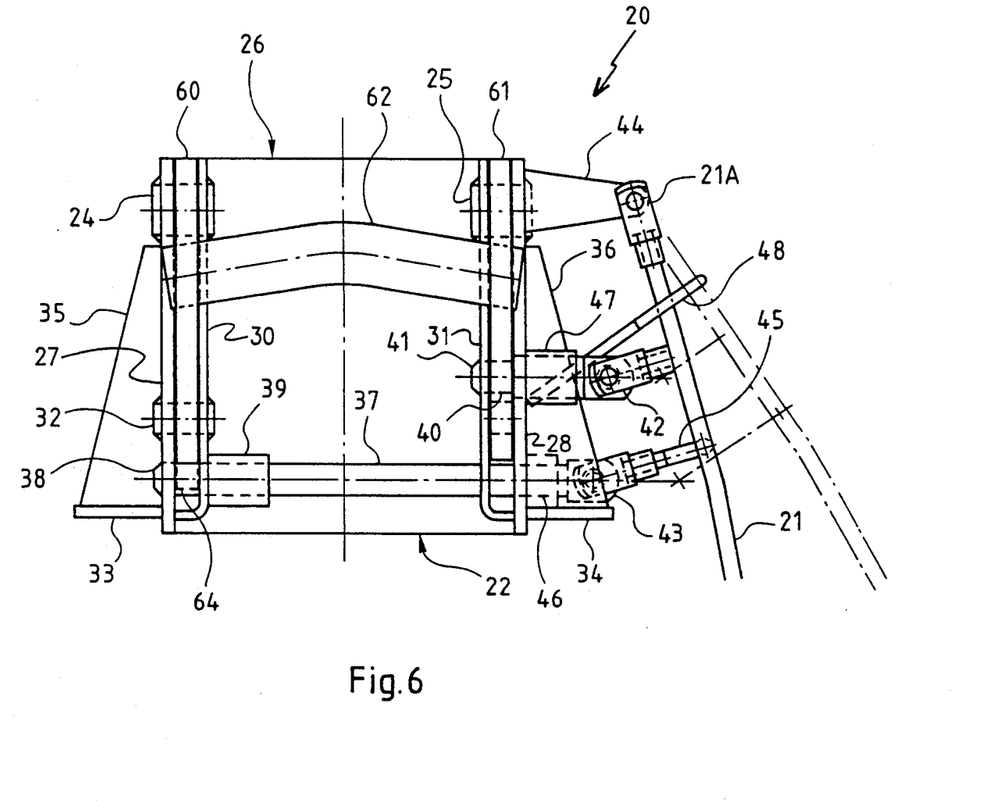
FIG. 6 is a front view seen in the direction of the arrow VI in FIG. 5.

It will be appreciated that, to manipulate the pin 40 and the rod 37, it suffices to move the maneuvering bar 21 away laterally (see FIG. 6). To prevent any untimely excessive displacement, the maneuvering bar is engaged in an arched element 48 fixed to the wing 28.

It will be noted that the axis X—X is located near the top of the wings 27 and 28 and close to the back wall whereas the rod 37 is located near the bottom of the wings 27 and 28 and close to the back walk 29 approximately vertically below the axis X—X.

As for the blocking or retaining rivet 32 and the pin 40, they are in front relative to the axis X—X, having in this case axes substantially coplanar with the axis X—X. The plane P passing through the axis of the retaining rivet 32 and the axis X—X forms an angle $\alpha$ of about 43° with the plane P' passing through the axis of the rod 37 and the axis X—X.

The pivotable assembly 23 includes two flanges 60 and 61 engaged in slots formed by the wings 27 and 28 and the plates 30 and 31 and is mounted to be pivotable about the bodies of the rivets 24 and 25 forming the axis X—X.

The flanges have the general shape of sectors of discs centered on the X—X axis and have an angular amplitude of about 80°.

The flanges project radially from the slots in the base and are connected to pivot together by a holding bar 62 substantially parallel to the axis X—X and located in the upper corner of the flanges situated at a distance from the X—X axis.

The radial dimension r of the flanges is slightly less than the distance between the axis X—X and the blocking rivet 32 or the free end 38 of the rod 37. On the contrary, the flange (in this case 60) located in the slot through which the end 38 usually passes has, along its vertical edge, a radially projecting finger 64 adapted to come to bear circumferentially against the end 38 or against the blocking rivet 32.

The other flange, 61, has two apertures 65 and 66 (see FIGS. 4 and 7) situated relative to the axis X—X at the same distance as the pin 40 and offset angularly about the axis X—X by an angle equal to $\alpha$.

The angle $\alpha$ is the angle of displacement of the pivotable assembly 23.

In the configuration shown in FIGS. 2 and 4 to 6, the assembly is in the lowered configuration. The radially projecting finger 64 extends substantially vertically downwardly extending near the back wall 29 and bearing against the free end 38 of the rod 37. The movable assembly is blocked in position by the penetration of the pin 40 into the aperture 66 in the flange 61.

In this configuration the ring is at a first distance $L_1$ in front of the arresting crossbeam 6 and at a first height $H_1$ above the bottom side 8 of the longitudinal beams of the lifting cradle.

These first dimensions are chosen to conform to a first standard, in this case the AFNOR standard, number NFR17108, where $L_1 = 200$ mm and $H_1 = 1425$ mm (see FIG. 2).

Figure 7:
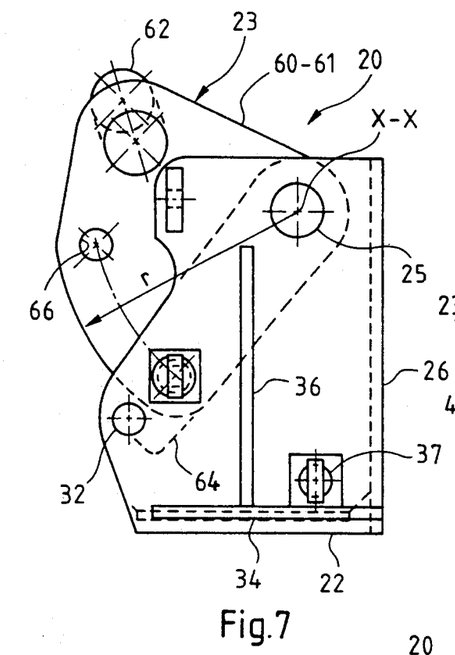
FIG. 7 is a view of the bar-carrying assembly similar to that shown in FIG. 4 but in its other configuration shown in FIG. 3.

To move the holding bar to a second distance in front $L_2$ and to a second height $H_2$, conforming to a second standard, in this case the DIN standard, number 30722, where $L_2 = 175$ mm and $H_2 = 1570$ mm, the maneuvering bar 21 is displaced laterally (see the chain doted lines in FIG. 6) so as to disengage the free end 38 of the bar from the slot formed between the plate 30 and the wing 27 and also the pin 40 from the aperture 66 in the flange 61 located in the other slot. The pivotable assembly 23 is then freed and may be raised by an appropriate known means, manual or motorized, for example by the lifting hook of a loading/unloading arm, until the configuration shown in FIGS. 3 and 7 is reached where the radially projecting finger 64 bears against the blocking rivet 32 and where the pin 40 is opposite the second aperture 65 in the flange. It then suffices to move the maneuvering bar 21 back against the column 10 to lock the pivotable assembly in the second operating configuration.

To return to the first configuration, it suffices to repeat the operation, except for the fact that gravity by itself suffices to cause pivoting of the assembly.

Of course, it is within the ability of a person skilled in the art to choose the location of the axis X—X and the displacement angle $\alpha$ based on the sizes of $L_1$, $L_2$, $H_1$ and $H_2$ and on the structure which may be envisaged for this pivotable equipment.

In the figures it is the standards AFNOR and DIN which have been taken into consideration, as a result of which the lifting cradle shown is a dual standard DIN-/AFNOR cradle. It is however within the ability of a person skilled in the art to design in accordance with the same principle cradles conforming to two (or even three or more) other standards, depending on the requirements and the places where they are used.

It goes without saying that the preceding description has been given solely by way of non-limiting example and that numerous variations on it may be proposed by a person skilled in the art without departing from the scope of the invention.

What is claimed is:

1. A movable lifting cradle comprising:
   two elongate members having a crossmember interconnected therebetween, each of said two elongate members supporting a base;
   a holding bar pivotably mounted to said base for movement about a transverse pivoting axis, said holding bar being pivotable between first and second positions defining a predetermined angular displacement;
   two transverse flanges pivotably connected to said base, said holding bar interconnecting said two transverse flanges, a first of said two transverse flanges having first and second apertures therein, said first and second apertures being spaced equidistant from said transverse pivoting axis and being offset angularly by an angle substantially equal to said predetermined angular displacement; and
   retaining means mounted to said base for selectively retaining said holding bar in said first and second positions, said retaining means comprising a pivotable assembly for selectively operating said retaining means and a pin member aligned substantially parallel to said transverse pivoting axis and connected to said pivotable assembly, said pin member being located a predetermined rectilinear distance from said transverse pivoting axis, said holding bar being at a first distance relative to said crossmember and at a first height relative to said two elongate members when in said first position, said holding bar further being at a second distance relative to said crossmember and at a second height relative to said two elongate members when in said second position.

2. A lifting cradle according to claim 1, wherein said first and second distances and said first and second heights conform to DIN standard number 307222 and AFNOR standard number NFR17108.

3. A lifting cradle according to claim 1, wherein said base further defines two slots each having pivotably located therein one of said two transverse flanges interconnected by said holding bar.

4. A lifting cradle according to claim 3, wherein each said two transverse flanges are shaped as angular sectors having a center and a corner, said center of said two transverse flange being located at said transverse pivoting axis, and said holding bar being connected to said two transverse flanges at said corners thereof so as to be spaced a fixed distance from said transverse pivoting axis.

5. A lifting cradle according to claim 4, wherein said retaining means comprises a retractable stop and a fixed stop, and wherein one of said two transverse flange has a radial member for bearing against said retractable stop and against said fixed stop.

6. A lifting cradle according to claim 5, wherein said retractable stop comprises a bar arranged substantially parallel to said transverse pivoting axis, and means attached to said retractable stop for rectilinearly displacing said bar along an axis thereof.

7. A lifting cradle according to claim 3, further comprising a maneuvering member pivotably attached to said base for selectively engaging said pin member with one of said first and second apertures of said first of said two transverse flanges.

8. A lifting cradle according to claim 3, wherein said retaining means further comprises a first retractable member, one of said two transverse flanges comprises a radial member for positioning said pivotable assembly in said first and second positions, and a second of said two transverse flanges defines first and second apertures offset angularly about said transverse pivoting axis by an angle substantially equal to said predetermined angular displacement, said first and second apertures receiving said first retractable member in said first and second positions, respectively.

9. A lifting cradle according to claim 8, wherein said retaining means further comprises a maneuvering member pivotably attached to said base, a fixed stop connected to a first of said two slots, and a second retractable member, said first and second retractable members being attached to said maneuvering member.

10. A lifting cradle according to claim 3, wherein said base is U-shaped, said base comprising a concave portion facing towards a front direction of said lifting cradle; a pair of flanges on each side of said concave portion and defining said two slots; a back wall interconnecting said pair of flanges; and two fixing plates attached to said base and extending laterally opposite one another.

* * * * *

UNITED STATES PATENT AND TRADEMARK OFFICE
CERTIFICATE OF CORRECTION

PATENT NO. : 5,257,844

DATED : November 2, 1993

INVENTOR(S) : Jean Baptiste Patouillard and Albert Heritier

It is certified that error appears in the above-identified patent and that said Letters Patent is hereby corrected as shown below:

Column 2, line 18, delete "Uti-" insert ---- uti- ----.

Column 3, line 9, delete ---- is ----.

Column 3, line 67, after "from" insert ---- the ----.

Column 4, line 6, delete ---- , ----.

Column 4, line 52, after "29" insert ---- , ----.

Column 5, line 57, delete "Suffices" insert ---- suffices ----.

Column 5, line 60, delete "$L_2 2$," insert ---- $L_2$, ----.

UNITED STATES PATENT AND TRADEMARK OFFICE
CERTIFICATE OF CORRECTION

PATENT NO. : 5,257,844

DATED : November 2, 1993

INVENTOR(S) : Jean Baptiste Patouillard and Albert Heritier

It is certified that error appears in the above-identified patent and that said Letters Patent is hereby corrected as shown below:

Column 6, line 3, delete ---- , ----.

Column 6, line 54, delete "flange" insert ---- flanges ----.

Column 6, line 61, delete "flange" insert ---- flanges ----.

Column 6, line 62, after "retractable" insert ---- , ----.

Signed and Sealed this

Fifth Day of July, 1994

BRUCE LEHMAN

Attest:

Attesting Officer

Commissioner of Patents and Trademarks